June 13, 1950            I. CARLSON            2,511,044

BEARING PULLER

Filed May 3, 1948

Inventor

Iver Carlson

By *Clarence A. O'Brien and Harvey B. Jacobson*
Attorneys

Patented June 13, 1950

2,511,044

UNITED STATES PATENT OFFICE 2,511,044

BEARING PULLER

Iver Carlson, Los Angeles, Calif.

Application May 3, 1948, Serial No. 24,731

1 Claim. (Cl. 29—283)

This invention relates to new and useful improvements in bearing removers and the primary object of the present invention is to provide a device for pulling and removing both the forward bearing and rear bearing from a compressor housing of a refrigerator.

Another important object of the present invention is to provide a bearing removing tool including a pair of complementary bearing pulling hooks and novel and improved means for gaging the spring of said pulling hooks relative to each other whereby the same will engage with positive results a bearing that is to be removed.

A further object of the present invention is to provide a bearing puller that is quickly and readily manipulated in a convenient manner to effectively remove bearings and more particularly the front and rear bearings of a compressor.

A still further aim of the present invention is to provide a bearing puller of the aforementioned character that is simple and practical in construction, strong and reliable in use, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
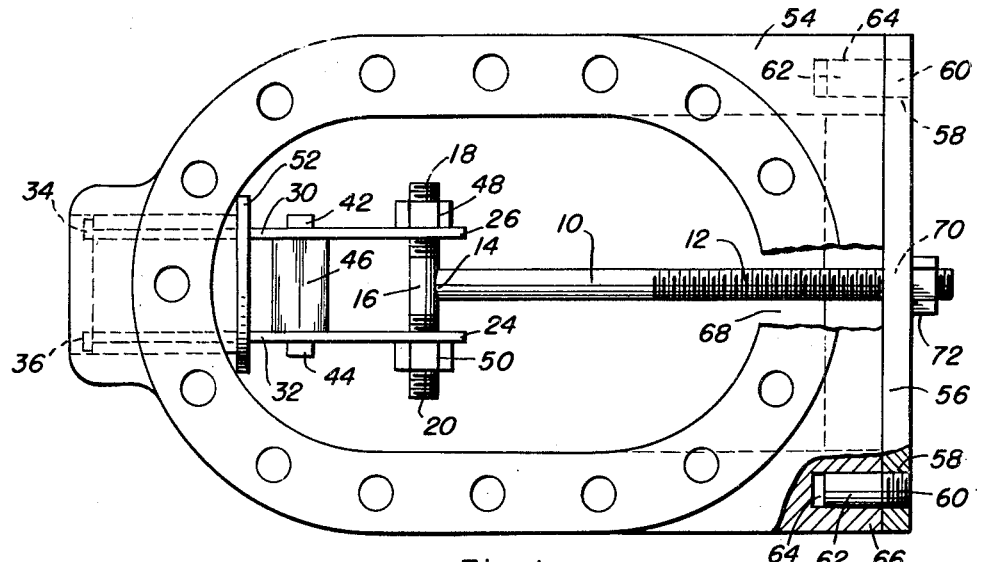
Figure 1 is a top plan view of the present invention applied to a compressor housing for removing the rear bearing thereof.
Figure 2:
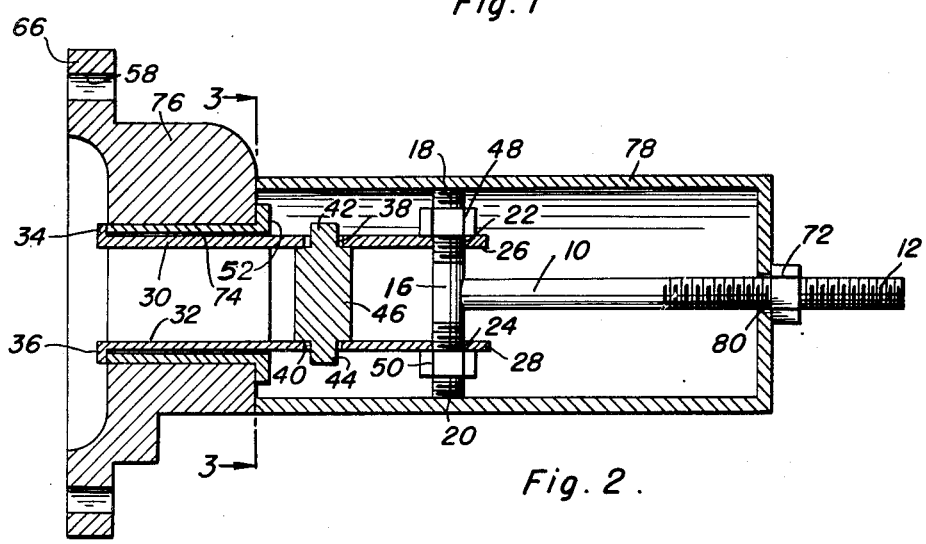
Figure 2 is a longitudinal vertical sectional view of the present invention and of a compressor bearing head on which the present bearing puller is applied, and showing the anchoring member in slightly modified form; and, Figure 3 is a transverse vertical sectional view taken substantially on the plane of section line 3—3 of Figure 2.
Figure 3:
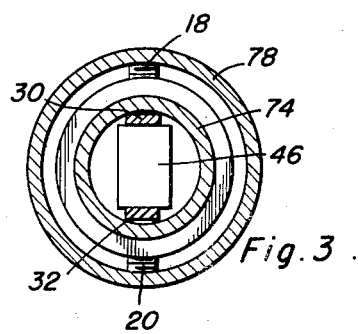

Referring now to the drawings in detail, wherein for the purpose of illustration, there is disclosed a preferred embodiment of the present invention, the numeral 10 represents a puller rod the outer or forward end 12 of which is externally threaded. Fixed by welding or the like to the forward end 14 of the puller rod, is a cross member or bar 16 having threaded end portions 18 and 20.

Slidably receiving the end portions 18 and 20 of the cross member 16 are apertures or openings 22 and 24 provided adjacent the forward ends 26 and 28 of a pair of companion gripping plates or members 30 and 32 having inturned or angulated rear or outer terminals 34 and 36. These gripping members 30 and 32 are also provided with a further pair of opposed openings 38 and 40 that receive the reduced end portions 42 and 44 of a preferably cylindrical spacing member or fulcrum 46 that is removably positioned between the gripping members 30 and 32.

Receivably engaging the threaded ends 18 and 20 of the cross member 16, is a pair of retaining nuts 48 and 50 that are adjustable for retaining the gripping members relative to the cross member 16 and for retaining the rear terminals 34 and 36 of the members 30 and 32 spaced from each other a predetermined distance.

In practical use of the present invention for removing the rear bearing 52 from a compressor housing 54, there is provided an anchor member or plate 56 having threaded apertures 58 that receive the threaded ends 60 of a group of outwardly projecting studs 62 which enter recesses or bolt holes 64 provided in the forward portion 66 of the compressor housing 54. The pull rod 10 extends through an opening 68 in the housing 54 and an opening 70 in the anchor member 56.

A lock nut 72 adjustably mounted on the threaded end 12 of the rod 10 bears against the anchor member 56 for longitudinal adjustment of the pull rod. It being understood, that the ends 34 and 36 of the gripping members 30 and 32 engage the rear bearing 52 to pull the same forwardly as the nut 72 is rotated in one direction.

In practical use of the present invention in removing the forward bearing 74 from the compressor bearing head 76 that has been disengaged from the compressor housing 54, the anchor member 56 is replaced by a further anchor member or shell 78 that includes an opening 80 for slidably receiving the end 12 of the puller rod 10, and it is noted that the shell bears against the bearing head 76.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim, Having described the invention, what is claimed as new is:

A bearing puller comprising an elongated rod, an elongated cross-bar rigidly secured at its central portion to one end of said rod, said cross-bar being disposed perpendicular to said rod, a pair of elongated gripping plates having inner and outer end portions, the inner end portions of said gripping plates having openings slidably receiving the ends of said cross-bar, said gripping plates also having a pair of apertures disposed adjacent said openings, a combined spacer and fulcrum block interposed between said gripping plates and having reduced end portions received in said apertures, and nuts threaded on the ends of said cross-bar and bearing against the inner end portions of said gripping plates for retaining the outer end portions of said gripping plates spaced relative to each other.

IVER CARLSON.

REFERENCES CITED

The following references are of record in the file of this patent:

UNITED STATES PATENTS

| Number | Name | Date |
| --- | --- | --- |
| 216,334 | Leyburn | June 10, 1879 |
| 674,882 | Sivits | May 28, 1901 |
| 725,169 | Stephens | Apr. 14, 1903 |
| 788,287 | Swanson | Apr. 25, 1905 |
| 791,032 | Killian | May 30, 1905 |
| 1,126,612 | Wright | Jan. 26, 1915 |
| 1,754,059 | Staser | Apr. 8, 1930 |
| 2,052,304 | Kaplan | Aug. 25, 1936 |
| 2,421,324 | Graham | May 27, 1947 |